United States Patent [19]

Schach

[11] Patent Number: 5,224,368
[45] Date of Patent: Jul. 6, 1993

[54] FLYING DIE MACHINE

[76] Inventor: Herbert U. Schach, 1503 Jaeger Dr., Lyndhurst, Ohio 44124

[21] Appl. No.: 863,429

[22] Filed: Apr. 3, 1992

[51] Int. Cl.$^5$ ............................................ B23D 25/04
[52] U.S. Cl. ...................................... 72/185; 72/447; 83/320
[58] Field of Search .................... 83/318, 319, 320; 72/184, 185, 447

[56] References Cited

U.S. PATENT DOCUMENTS

| | | |
|---|---|---|
| Re. 22,114 | 6/1942 | Borzym . |
| 2,198,599 | 4/1940 | Borzym . |
| 2,234,999 | 3/1941 | Yoder . |
| 2,243,614 | 5/1941 | Yogel . |
| 2,572,137 | 10/1941 | Grieder . |
| 3,129,624 | 4/1964 | Auer . |
| 3,143,018 | 8/1964 | Everett . |
| 3,273,433 | 9/1966 | Borzym . |
| 3,288,011 | 11/1966 | Borzym . |
| 3,288,012 | 11/1966 | Borzym . |
| 3,460,421 | 8/1969 | Borzym . |
| 3,924,502 | 12/1975 | Borzym . |
| 3,958,467 | 5/1976 | Borzym . |
| 4,031,792 | 6/1977 | Borzym . |
| 4,036,091 | 7/1977 | Borzym . |
| 4,055,096 | 10/1977 | Borzym . |
| 4,055,100 | 10/1977 | Borzym . |
| 4,108,029 | 8/1978 | Borzym . |
| 4,193,486 | 3/1980 | Borzym . |
| 4,228,706 | 10/1980 | Borzym . |
| 4,294,147 | 10/1981 | Borzym . |
| 4,301,723 | 11/1981 | Borzym . |
| 4,315,449 | 2/1982 | Borzym . |
| 4,337,680 | 7/1982 | Borzym . |
| 4,376,401 | 3/1983 | Borzym . |
| 4,411,182 | 10/1983 | Borzym . |
| 4,437,374 | 3/1984 | Borzym . |
| 4,457,200 | 7/1984 | Borzym . |
| 4,499,803 | 2/1985 | Borzym . |
| 4,542,670 | 9/1985 | Borzym . |
| 4,562,760 | 1/1986 | Kinsley . |
| 4,563,927 | 1/1986 | Kinsley . |
| 4,614,139 | 9/1986 | Borzym . |
| 4,624,168 | 11/1986 | Borzym . |
| 4,631,998 | 12/1986 | Borzym . |
| 4,635,514 | 1/1987 | Borzym . |
| 4,646,601 | 3/1987 | Borzym . |
| 4,694,718 | 9/1987 | Kinsley . |
| 4,766,792 | 8/1988 | Borzym . |
| 4,796,498 | 1/1989 | Borzym . |
| 4,865,300 | 9/1989 | Borzym . |
| 4,872,384 | 10/1989 | Borzym . |
| 4,903,822 | 2/1990 | Borzym . |
| 4,909,110 | 3/1990 | Borzym . |
| 4,932,297 | 6/1990 | Borzym . |
| 4,951,538 | 8/1990 | Borzym . |
| 5,003,853 | 4/1991 | Borzym et al. . |
| 5,005,692 | 4/1991 | Borzym . |

OTHER PUBLICATIONS

Robonex "Hydra-Shear Flying Cutoffs For Roll Forming and Bi-Laminate Extrusion Lines" advertising Leaflet.

Rebonex "The Dimple Free Flying Hydra-Shear For Pipe and Tubing Mills" Advertising leaflet.

Primary Examiner—Lowell A. Larson
Attorney, Agent, or Firm—Watts, Hoffmann, Fisher & Heinke

[57] ABSTRACT

A flying die apparatus including a reciprocally movable carriage mounting a plurality of die heads capable of performing sequential or concurrent operations on a strip stock segment aligned and moving with the carriage. The die support heads include a rotatable coupling which provides a common source of pressurized fluid for die actuators forming part of the head while enabling the die elements to be rotated with respect to the processing line. Rotatable nut assemblies engageable with elongated ball screw shafts interconnect the heads to maintain a rigid spacing between the heads while providing a means for adjusting the relative position of the heads with respect to each other. A gimbal mounting is also provided to enable the die support heads to be angled with respect to the processing line to perform angled cuts, etc.

20 Claims, 7 Drawing Sheets

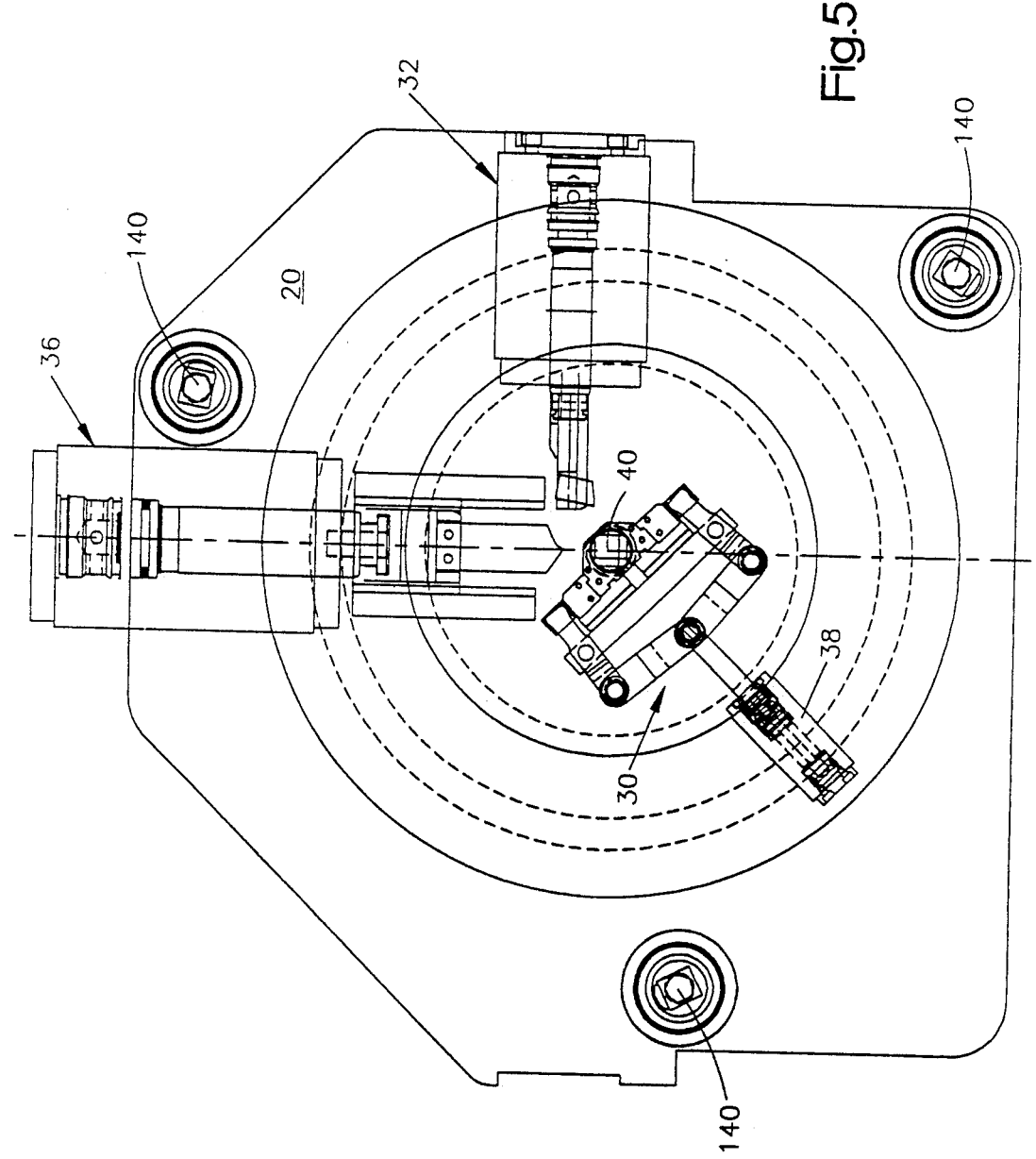

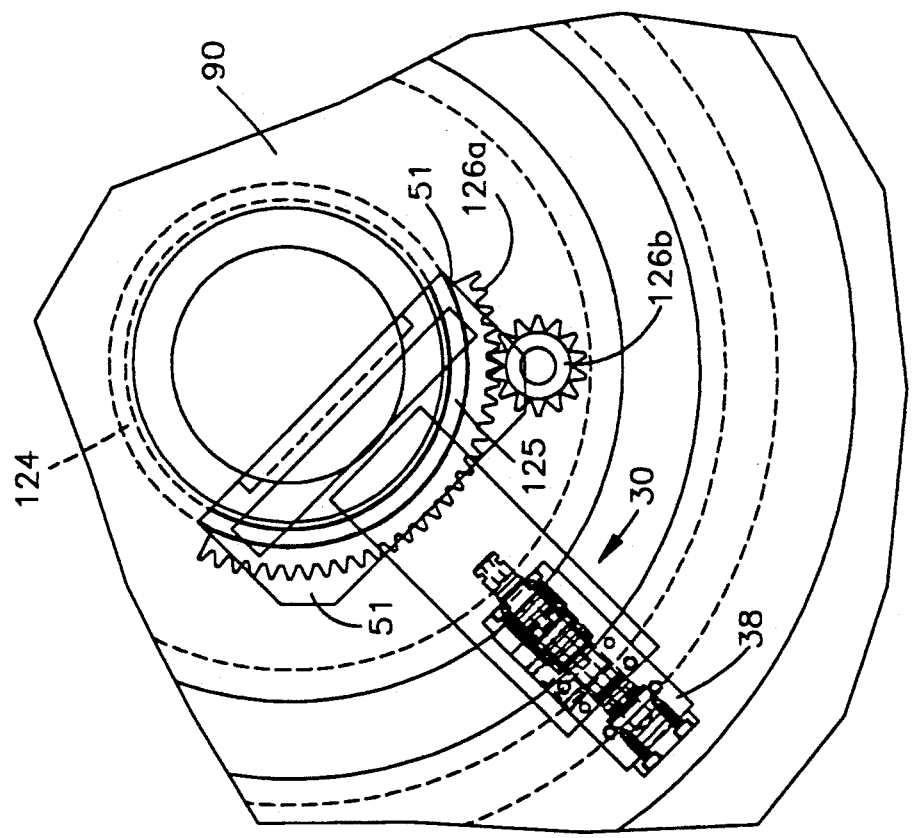
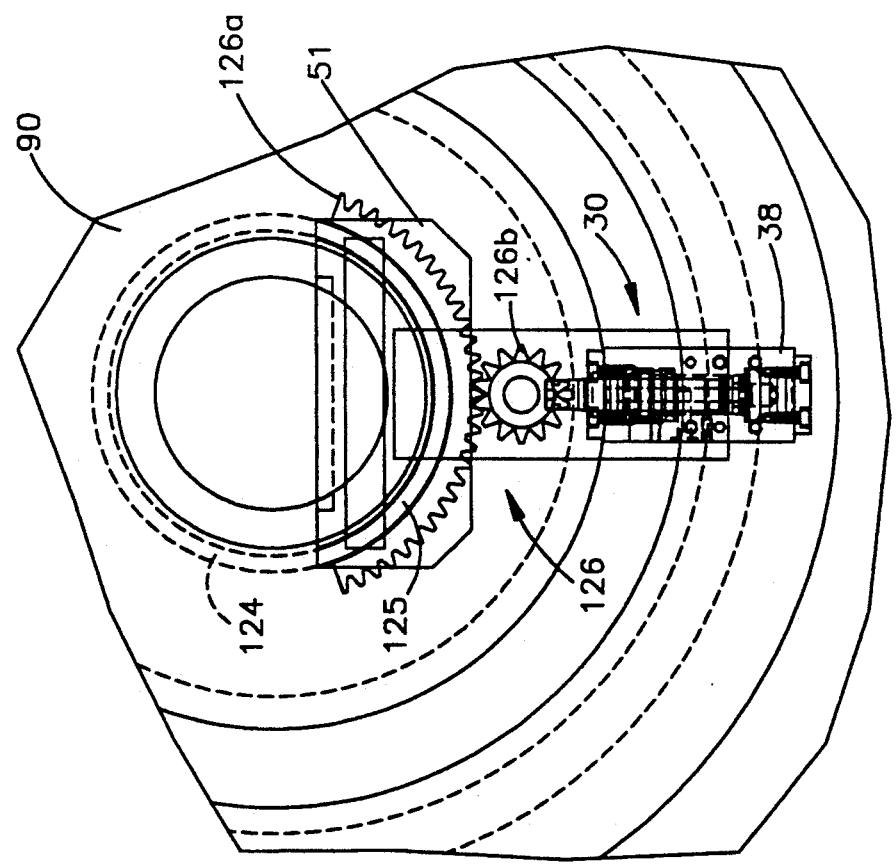

FLYING DIE MACHINE

TECHNICAL BACKGROUND

The present invention relates generally to flying die apparatus and in particular to a multi-head flying die apparatus that includes means for reorienting and adjusting die sets forming part of the die head, with respect to a strip stock processing line.

BACKGROUND ART

Tubing and other types of metal stock are frequently manufactured in continuous, high-speed forming mills. Hundreds of feet of finished stock emanate from these mills at high sped, necessitating use of a cut-off apparatus at the terminal end of the mill to cut the stock into manageable lengths.

Flying cutoff apparatus of the type in which a cutting tool moves in synchronization with a continuously moving workpiece, i.e., tube stock, is well known in the art. Typically, the cutting tool is mounted on a carriage which in turn is slidably supported on a base for movement in a direction aligned with the workpiece's path of travel. A so-called "accelerator" coupled with the carriage accelerates the carriage from a stationary starting position along the path of travel of the workpiece until the rate of travel of the carriage equals that of the workpiece itself. Depending upon the type of workpiece involved, means may be provided on the carriage for clamping the workpiece to the carriage to assure that the workpiece is held stationary relative to the carriage prior to the cutting operation. Immediately after the workpiece is severed, the accelerator decelerates the carriage and returns the same to its starting position, in preparation for the next severing operation. One type of known prior art accelerator consists of a hydraulically operated cylinder member whose reciprocating output shaft is connected to the carriage. The cylinder is of the double action type such that a first actuation thereof extends the output shaft to accelerate the carriage to the speed of the workpiece. Reverse actuation of the cylinder retracts the output shaft thereby returning the carriage to its starting position.

In the past, flying cutoff machines were primarily used to sever lengths of strip stock as they exit the strip forming machine. If additional machining or forming operations are needed on the cut stock, the stock is transferred to another machine where the operations are performed separately.

In many prior art flying cutoff machines, very little, if any, flexibility is provided for changing the position of the tooling or accommodating a multitude of strip stock orientations. In general, many prior art flying cutoff machines are designed to sever a certain type of strip stock presented in a predetermined orientation and cannot accommodate changes in the strip stock configuration or orientation without substantial down time or machine modification.

DISCLOSURE OF THE INVENTION

The present invention provides a new and improved flying die apparatus having multiple die heads and which is capable of performing a multiplicity of operations such as shearing, punching, slotting, notching on various strip stock configurations and in a continuous manner as the strip stock exits a strip forming machine.

According to the invention, the flying die apparatus includes a carriage mounted for reciprocal movement along a predetermined path. The carriage is mounted on a base and is positioned to receive strip stock which may be introduced directly from a strip forming machine such as a tube mill. An accelerator, which may be a conventional hydraulically operated actuator, is used to accelerate the carriage to align it with a position on the moving strip stock and to synchronize its speed with that of the strip stock. The carriage includes at least one die head containing at least one fluid pressure operated tool carried by a tool mounting member which is used to perform an operation on the strip stock segment aligned and moving with the carriage. A rotatable mounting means forming part of the die head enables the tool or tools carried by the die head to be rotated with respect to the access of the strip stock passing through the carriage. The rotary support provides a common source of pressurized fluid for fluid pressure operated actuators mounted to the head. The rotary coupling also provides a connection for return pressure for the actuators. With this feature, hose entanglements are avoided or reduced when the tool mounting member is rotated with respect to the stationary portion of the head. The plumbing of the fluid pressure system is also simplified in that only a single pressure hose and return hose extend between the head and the fluid pressure system which is usually located remote from the moving carriage.

According to this feature, the rotary support member includes a hub fixed to a head support plate which is rotatably engaged by a coupling member that is fixed to the die mounting member. In the illustrated embodiment, the die support member comprises a die mounting plate. According to the preferred and illustrated embodiment, the hub defines at least two annular channels, one of which communicates with the fluid pressure feed conduit, the other of which communicates with the system return conduit. O-rings positioned between the channels sealingly engage the coupling member while allowing rotative movement in the die mounting plate. The plumbing for the high pressure and return lines to the individual actuators are simplified because ports formed in the coupling member communicate directly with the high pressure and return channels defined by the hub member. Relatively short conduits communicate source or return pressure from the respective channels, through the ports, in the coupling member to appropriate ports in the die actuators.

In the preferred and illustrated embodiment, valving for controlling the communication of source pressure to chambers in the actuators for extending and retracting a actuator element are integrated into the die assembly itself. Wires for conveying control signals to the electrically operated valving are connected to the actuators. A control system, not forming part of the present invention, issues signals to the electrically controlled valving to energize and de-energize the fluid pressure operated actuator.

According to another feature of the invention, multiple die heads are carried by the carriage which can be operated to perform sequential and concurrent operations on a strip segment aligned and moving with the carriage. For example, one head may be used to clamp and sever the segment whereas another head spaced from the first head is used to punch, notch, or slot the stock.

According to this feature of the invention, when multiple heads are mounted in the carriage, all move in unison when accelerated by the accelerator. In the preferred and illustrated embodiment, however, means is provided for adjusting the relative spacing between the heads. In the exemplary embodiment, each head includes a spacing adjustment mechanism which preferably comprises threaded members adapted to receive a threaded shaft which concurrently engages all of the heads mounted in the carriage.

In the illustrated embodiment, each head includes three spaced rotatable nut assemblies. When mounted in the carriage, the corresponding nut assemblies of each head are aligned and receive three elongated threaded shafts which operate to maintain a fixed spaced relation between the heads. By concurrently rotating the nut assemblies of a given head, that head is caused to move along the threaded shafts towards or away from the adjacent head, depending on the direction of nut rotation. In addition, the shafts themselves can be concurrently rotated in order to adjust the overall position of all the heads simultaneously within the carriage.

The present invention contemplates several methods for rotating the nut assemblies and/or the threaded shafts. The nut assemblies of a given head can be interconnected by a chain or cog belt and then rotated manually using a crank or alternately one or more drive motors. The shafts themselves can also be rotated manually or power driven using suitable motors.

According to another embodiment of the invention, a gimbal assembly is used to interconnect a head base plate with the die support plate and which allows the die support plate and associated die sets to be positioned at an angle with respect to the strip processing line. With this feature, the angle of cut performed by a fluid pressure operated shear mounted to the die head can be changed.

Additional features of the invention will become apparent and a fuller understanding obtained by reading the following detailed description made in connection with the accompanied drawings.

BRIEF DESCRIPTION OF THE DRAWINGS

FIG. 5 is another elevational view of the die head shown in FIG. 2 with a jaw mechanism shown rotated 45°;

BEST MODE FOR CARRYING OUT THE INVENTION

Figure 1:
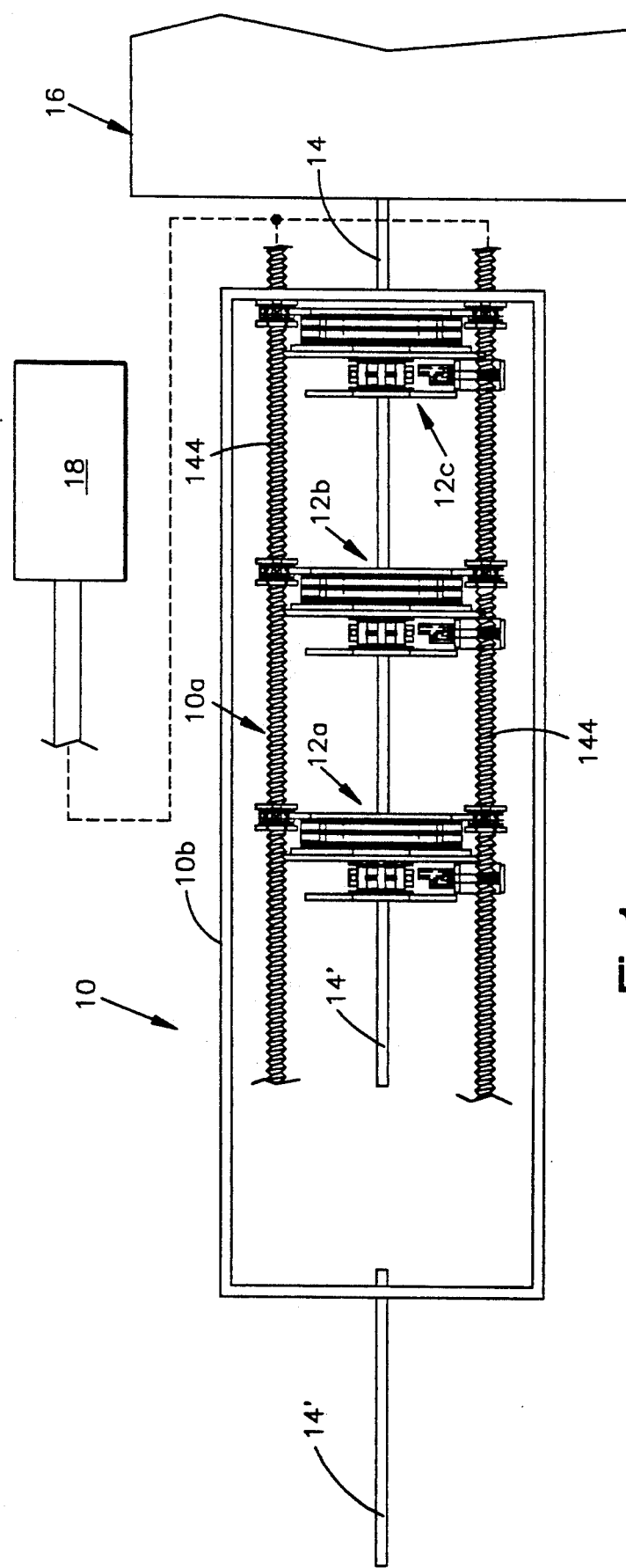
FIG. 1 is an overall view of a flying die apparatus, shown somewhat schematically, constructed in accordance with the preferred embodiment of the invention.

FIG. 1 illustrates the overall construction of a flying die apparatus indicated generally by the reference character 10 constructed in accordance with the preferred embodiment of the invention. The flying die machine 10 includes a carriage 10a (represented schematically) which mounts a plurality of heads 12a, 12b, 12c. The carriage is reciprocally movable on a fixed base or frame 10b (also shown schematically).

In operation, the carriage 10a is accelerated linearly (towards the left as viewed in FIG. 1) to match the speed of strip stock 14 exiting a stock forming machine indicated generally by the reference character 16. For example, the flying die machine 10 could be used for the purpose of performing cutting, notching, slotting, shearing and punching operations on tube stock or other shaped stock exiting a tube mill or roll forming machine which could be represented by the reference character 16.

At the commencement of an operating cycle, the carriage 10a would be at its right most or "home" position as viewed in FIG. 1. A conventional accelerating mechanism such as a fluid pressure operated actuator 18 (indicated schematically) accelerates the carriage 10a until its velocity matches the velocity of the tubing 14 leaving the tube mill 16 and the carriage 10a reaches a predetermined position with respect to the segment that is to be operated upon. When the speeds are synchronized, the heads 12a, 12b, 12c are actuated to perform punching/cutting operations on the tube. Depending on the application, one or more of the heads 12a, 12b, 12c, may include jaws to clamp the tube segment as it is being processed by the machine.

The die heads 12a-12c may include a plurality of tools including cutters, notching devices, punches, shears, etc.

Figure 2:
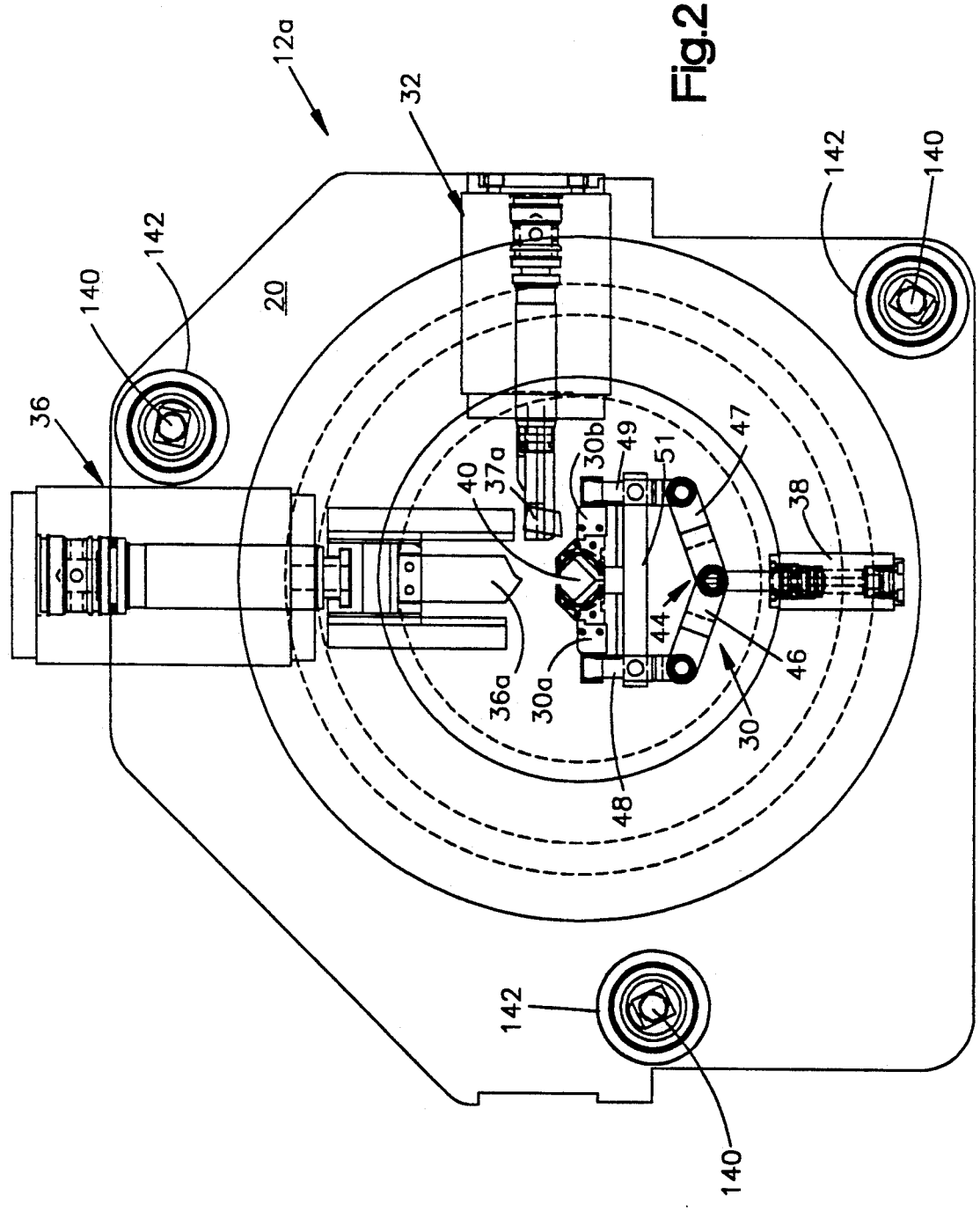
FIG. 2 is a side elevational view of a die head forming part of the machine shown in FIG. 1.

FIG. 2 illustrates an example of tools/dies that can be mounted or form part of any one of the heads 12a 12c. For purposes of explanation of the invention, FIG. 2 will represent the construction of the head 12a. It should be understood, that any of the other heads 12b-12c may include the same construction and conversely, the head 12a may include a different number and type of tools/die sets.

The head 12a includes a relatively rigid support plate 20. In the preferred and illustrated embodiment, each of the heads 12a-12c are relatively movable within the carriage 10a to adjust the relative spacing between the heads in order to adjust the location along the strip segment 14' where a given head will perform its machining operation.

The head 12a, shown in FIG. 2, includes three hydraulically operated devices. The first device is a hydraulically operated jaw mechanism 30 which in the illustrated embodiment, is designed to rigidly clamp square tube stock to prevent relative movement between tube stock and the carriage 10a during an operating cycle. Depending on the application, the jaw mechanism 30 may also be used to provide support for the stock during a shearing, punching, etc. cycle The head 12a also includes a fluid pressure operated notching device 32 as well as a fluid pressure operated shearing device 34 which operates to sever a tube held by the jaw mechanism 30. As is conventional, the notching device 32 includes a reciprocally movable notching tool 32a which, when actuated, notches the periphery of the tube held by the jaw mechanism 30. The notch is aligned with a guillotine knife 36a that forms part of the shearing device 36. Following the notching operation, the guillotine cutter 36 is actuated and completely severs the tube held by the jaw mechanism 30. As is known, by notching the periphery of the tube, a dimple-free cut-off is achieved. The head 12a when configured in the manner shown in FIG. 2, would be termed as a flying cut-off apparatus using industry recognized parlance.

As explained above, during the operating cycle, the carriage 10a (including the head 12a) would be accelerated towards the left (as viewed in FIG. 1) until the speed of the carriage 10a matches the speed of the tube stock 14. When the head 12a reaches a predetermined position along the tube segment 14' and the speed of the carriage 10a matches the speed of the tube segment, the jaw mechanism 30 is actuated by the communication of fluid pressure to an actuator 38 in order to clamp the tube. The cross cut or notching device 32 is then actuated to affect the notch in the periphery of the tube and then the guillotine cutter 36 is actuated to complete the severance. At the completion of the cycle, the jaw mechanism actuating cylinder is depressurized to release the cut tube segment and the carriage 10a is returned to its initial or home position shown in FIG. 1. The carriage is then again accelerated and positioned with respect to the tube stock to again perform its cut-off operation.

The jaw mechanism 30 shown in FIG. 2, includes a pair of jaws 30a, 30b designed to clamp strip stock that is box-shaped in cross-section. Jaw elements for clamping strip stock having cross-sections other than box shaped are contemplated by the present invention. For example, arcuate jaw elements would be used to clamp circular tubing. Other jaw elements would be used to clamp U-shaped strip stock. As can be seen best in FIG. 2, movement of the jaw elements 30a, 30b towards and away from each other is provided by a toggle mechanism indicated generally by the reference character 44. The fluid pressure operated actuator 38 includes an actuating rod which is connected to inks 46, 47. Intermediate links 48, 49 are pivotally connected to a jaw mounting bar 51, the upper ends of which include ball couplings connected to the jaw elements 30a, 30b. Extension of the actuator 38 produces outward movement in the lower ends of the intermediate links 48, 49 causing the upper ends of the links to move towards each other thereby producing clamping motion in the jaw elements.

Figure 3:
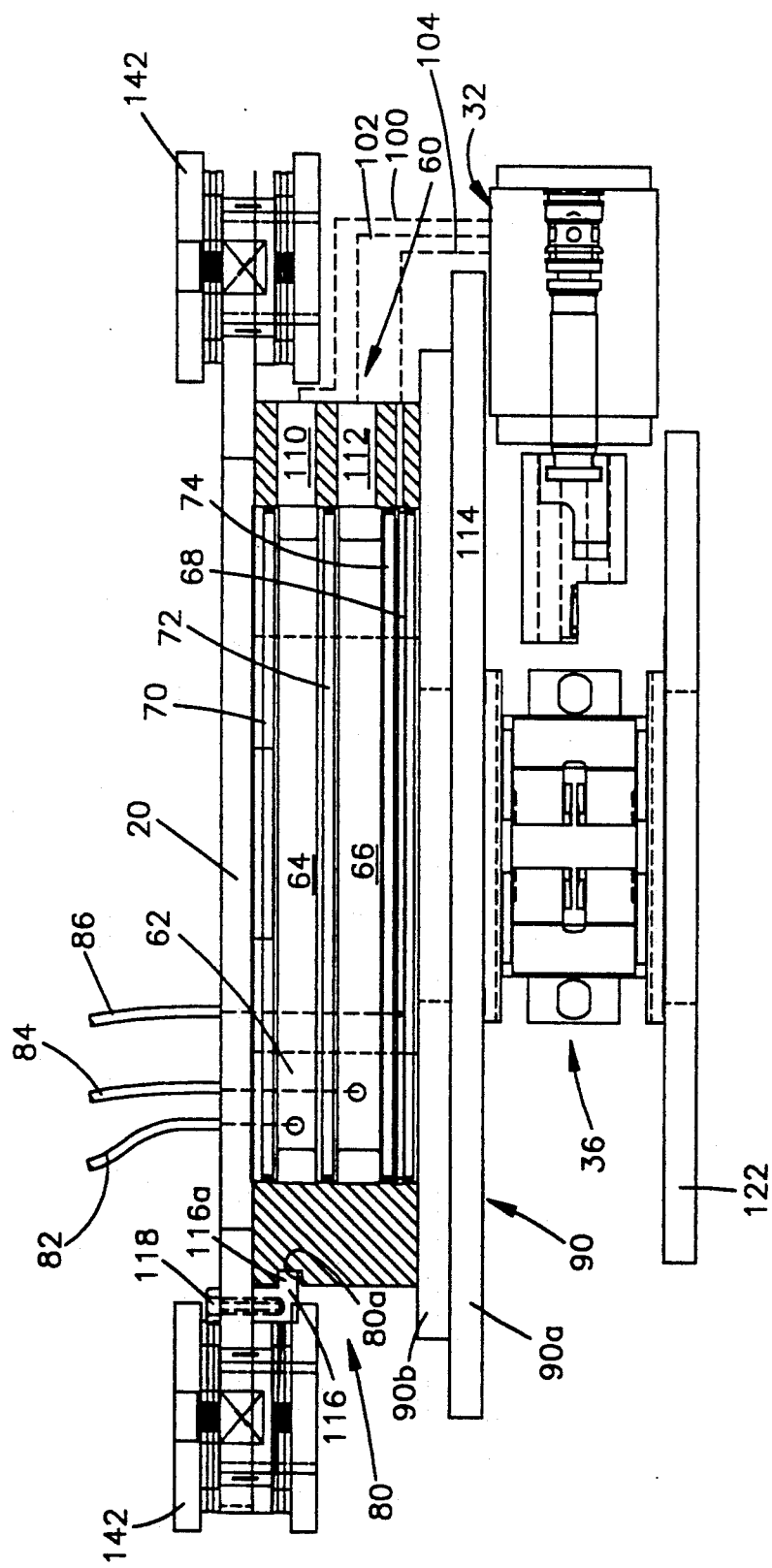
FIG. 3 is a top plan view of the die head shown in FIG. 2.

Referring in particular to FIGS. 2 and 3, the cross cut and vertical cut devices 32, 36 are mounted for rotation about a center axis 40, which in most applications is coincident with the central axis of the strip stock being operated upon. To achieve this feature, the head 12a includes a rotary fluid joint indicated generally by the reference character 60. In particular, and as seen best in FIG. 3, a hub 62 is rigidly attached to the base plate 20. In the preferred embodiment, three annular channels 64, 66, 68 are formed in the hub 62. O-ring grooves 70, 72, 74, 76 carry associated O-rings.

A rotatable coupling member 80 sealingly engages the hub 62 and is relatively rotatable with respect to the hub. The O-rings allow rotative movement between the hub 62 and the coupling member 80 while providing a fluid seal between the members. A source of pressurized fluid is communicated to one of the annular channels, i.e., channels 64 via pressure conduit 82 whereas the other channel 66 is communicated with a return conduit 84. The narrow channel 68 communicates with a drain conduit 86 which communicates with a tank or reservoir (not shown) of a hydraulic system.

A tool mounting plate 90 is rigidly attached to the coupling member 80 using conventional fastening techniques, i.e., by welding or bolting. In the illustrated embodiment, the mounting plate comprises adjacent, rigidly coupled plates 90a, 90b. The two plates, can be replaced by a single plate. The vertical cut-off knife 36 and the cross cut or notching device 32 are attached to the back plate 90 by conventional means, i.e., threaded fasteners. Pressurized fluid from the high pressure channel 64 is communicated to the cross-cut actuator by a rigid or flexible pipe 100. The return channel 66 is similarly communicated with the return port on the actuator by a separate conduit 102. As is conventional, a drain conduit 104 extends between a drain port on the actuator and the drain channel 68. The coupling member includes ports or passages 110, 112, 114 for fluidly communicating the channels 64, 66, 68 with the conduits 100, 102, 104, respectively extending to the actuator 32.

Similar conduits and coupling member ports connect the coupling member 80 with the cut-off actuator 36 and the jaw actuator 38. With the disclosed construction, individual pressure/return conduits are not required between the main fluid supply source (which is normally located in the base of the machine or at another remote location) and each individual actuator. As a result, rotation of the actuators with respect to the axis 40 of the machine, does not result in conduit entanglement, etc. nor does it require complex conduit routing.

The rotary joint serves a dual function. Firstly, it provides a rotatable mounting for the tooling forming part of the head 12a. Secondly, it simplifies the communication of high pressure fluid to the actuators 32, 36, 38.

In the illustrated embodiment, the control valving for the actuators is integrated within the actuator itself. In this disclosed construction, high pressure fluid from the high pressure channel 64 is communicated to the actuators throughout the operation of the machine. Similarly, the return and drain channels 66, 68 are in fluid communication with the actuators throughout the operation of the machine. When actuation of an actuator is desired, electrically controlled valves under the control of a machine control system (not shown) operate to communicate the high pressure fluid with a cylinder chamber to effect the extension (or retraction) of the actuator.

Figure 4:
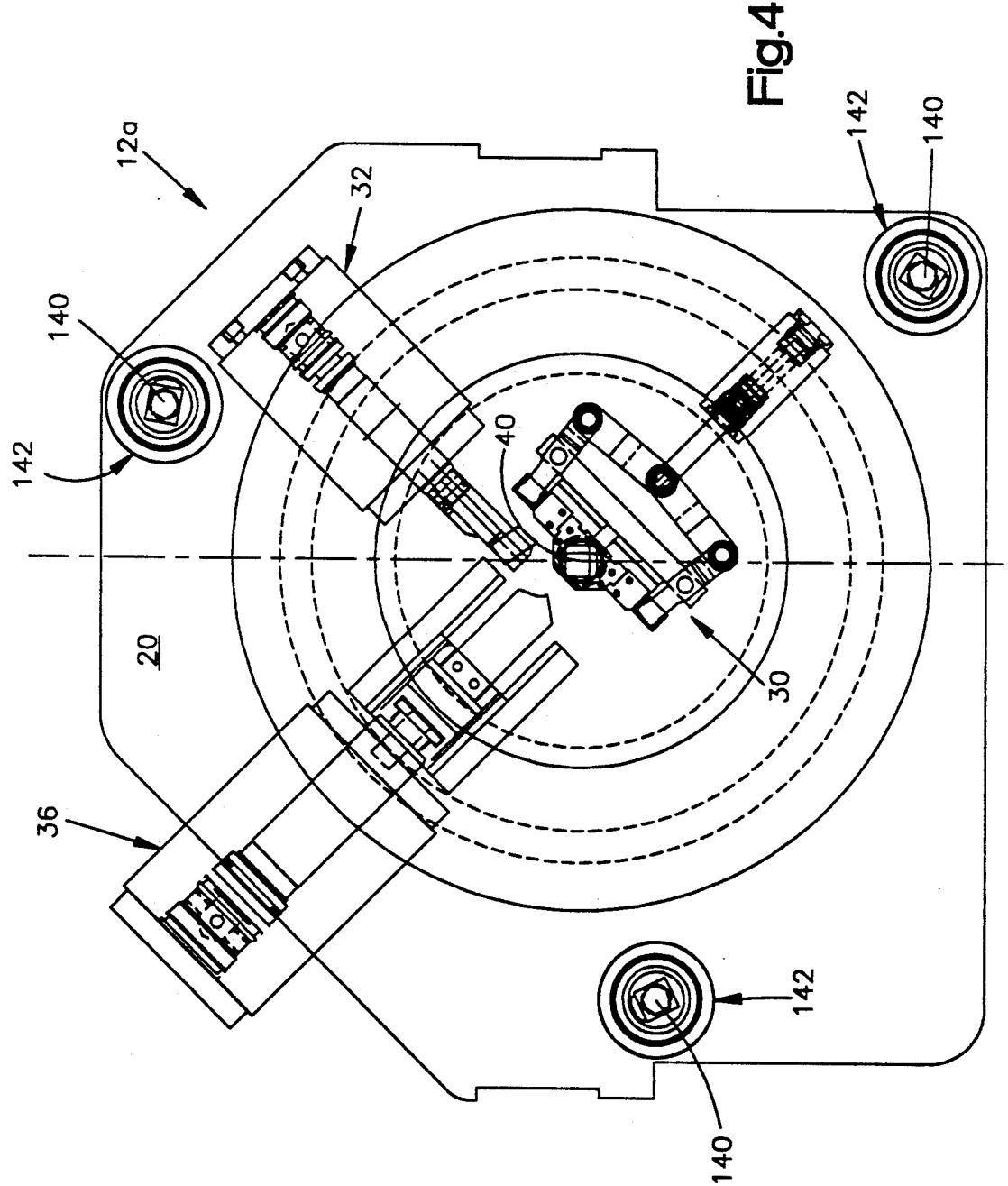
FIG. 4 is a side elevational view of the die head shown in FIG. 2 with certain die elements rotated 45°.

The coupling member 80 enables the back plate 90 and hence the attached actuators to be rotated with respect to the center line 40. FIG. 4 illustrates the position of the actuators 32, 36, 38 as they would appear if the coupling member 80 (and hence, the mounting plate 90) was rotated 45° with respect to the hub 62. With this feature, all three actuators (actuators 32, 36, 38) are rotated as a unit so that the spatial relationship between the three actuators remains the same after rotation. Referring also to FIG. 3, a clamping member 116 including clamping bolt 118 are used to lock the position of the coupling member 80 after an adjustment. In the illustrated embodiment, the coupling member 80 includes an annular, peripheral groove 80a, which is engageable by a tongue 116a forming part of the clamping member 116. The bolt 118 when tightened, draws the clamp 116 toward the back plate 20 and hence, rigidly clamps the coupling member 80 against the back plate 20 inhibiting relative movement between these two members. Although only one clamp is shown in FIG. 3, it should be understood that several of these clamps may be employed depending on the amount of clamping force required to maintain the position of the coupling member 80 during operation. It should be understood, that other locking mechanisms are also contemplated by the present invention for maintaining the position of the coupling member 80 with respect to the head support plate 20.

Referring now to FIGS. 5 and 7a, 7b, in the preferred embodiment, the jaw mechanism 30 is relatively movable with respect to the notching and cut-off devices 32, 36. Referring also to FIG. 3, the cut-off actuator 36 is clamped between a front plate 122 and the back plate 90. Ribbing (not shown) and/or stand-offs (not shown) extend between the front and back plates 122, 90 to form a rigid assembly.

The jaw mechanism 30 is held between the front and back plates 122, 90. In the illustrated embodiment, a pair of aligned, annular (or alternately semi-circular) recesses 124 (only one is shown in FIGS. 7a, 7b, are formed in plates 90, 122. The jaw mechanism 30 and in particular the support member 51, mounts an arcuate key 125 which has a radius of curvature sized to fit within the annular recesses 124 formed in the plates 90, 122. The key 125 is captured in the aligned recesses 124 and allows the jaw cylinder 38 to move along an arc which, in the preferred embodiment, extends 45° to either side of vertical.

In one embodiment, the jaw mechanism 30 is clamped by suitable fasteners between the plates 122, 90 after it is moved to the desired position. In this embodiment, the jaw cylinder 38 can be clamped in any position along the arc of movement. FIG. 5 illustrates the jaw mechanism 30 rotated 45° in the clockwise direction with respect to the position shown in FIG. 2.

In an alternate embodiment shown in FIGS. 7a, 7b, the position of the jaw mechanism 30 is adjusted and maintained by a drive mechanism indicated generally by the reference character 126. In this embodiment, a gear segment 126a is attached to the mounting plate 51 and is movable therewith. A motor driven spur gear 126b is carried by the mounting plate 90 (or alternately the plate 122) which, when rotated, moves the jaw mechanism 30 along the arcuate gear segment. FIG. 7b illustrates the position of the jaw mechanism 30 after the gear 126b is rotated counter-clockwise to move the jaw mechanism from the position shown FIG. 7a. Conventional clamping arrangements may also be employed to lock the position of the jaw mechanism after it is moved. Alternately, the drive system for the gear segment 126a may be used to inhibit movement in the jaw mechanism using for example an integrally formed brake or self locking worm drive.

The adjustability of the jaw mechanism 30 enables the machine to accommodate various orientations of the strip stock 14. The orientation of the strip stock is normally determined by the stock forming machine 16 and normally cannot be changed. In the past, it was difficult, if not impossible, to re-orientate the flying cut-off apparatus to accommodate the orientation of the strip stock exiting the strip forming machine. With the disclosed machine, a wide variety of strip stock orientations can be accommodated.

It should be noted that a similar drive system can be used to adjust the rotative position of the coupling member 80 with respect to the base plate 20. In particular, a motor drive attached to the back plate 20 would include a spur gear operatively engaging a gear formed or attached to the periphery of the coupling member 80. Rotation of the spur gear would produce attendant rotation in the coupling member 80 with respect to the base plate 20. The maintenance of the position of the coupling member after rotation by the drive motor, can be achieved using clamping members or integral motor brakes or worm drives.

This feature in combination with the adjustable positioning of the cut-off and cross-cut dies 36, 32 (shown in FIGS. 4 and 5) enables the operator to optimize the cutting direction for a particular form of strip material. For example, for box channel, optimum cutting may be achieved by assuring that the cut-off blade 36a contacts a corner of the channel initially, i.e., the channel is cut corner to corner. For other types of strip stock, the optimum cutting direction may be from a particular side or region on the stock. The adjustability of both the cut-off elements and the jaws, facilitate the cutting direction of the cutting dies.

In the preferred embodiment, the spacing between the heads 12a–12c is adjustable. In the preferred embodiment, each head includes nuts 140 which are mounted in rotatable bearings 142. Threaded ball screws 144 (shown in FIG. 1) extend through the aligned rotatable nut assemblies forming the part of each head 12a–12c. By rotating the ball screw, all three heads 12a–12c are moved axially with respect to the base 10b. By rotating the three nut assemblies of a given head, the relative position of that head with respect to the other heads can be adjusted.

Several mechanisms for rotating the nut assemblies are contemplated. For example, a cog belt or chain can be used to interconnect the three nut assemblies of a given head so that movement in the cog belt produces concurrent rotation in all three nut assemblies. Movement in the cog belt can be imparted either manually, via a crank, etc. or through one or more stepper motors. By the using steppers motors, movement in the head (or heads) can be achieved remotely and/or automatically under a suitable control system.

Figure 6A:
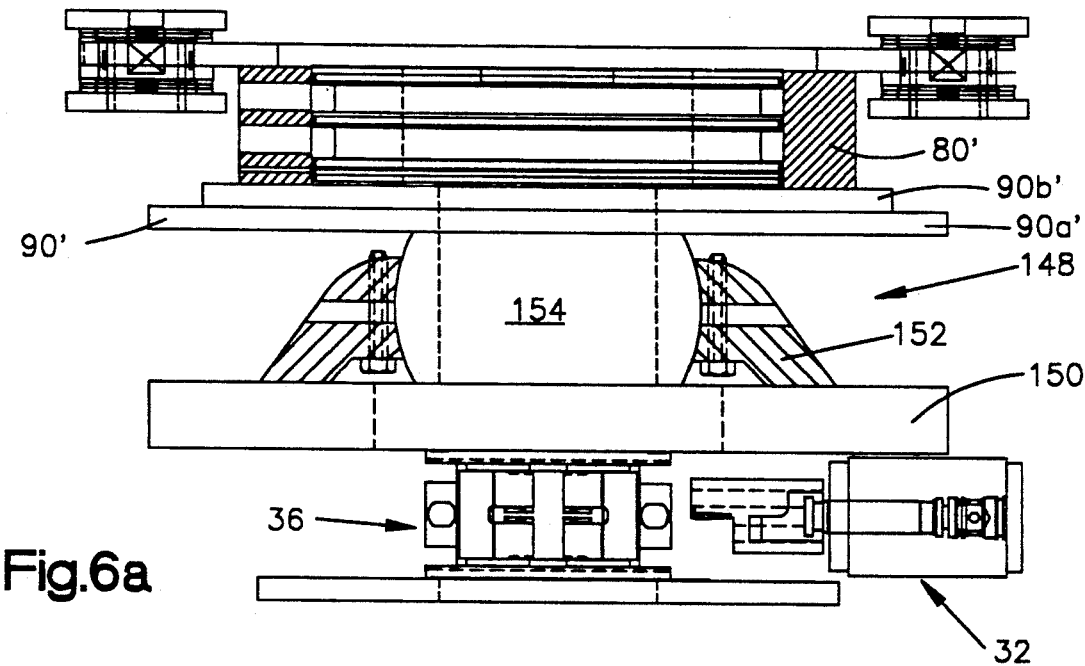
FIGS. 6a, 6b illustrate another embodiment of the invention which includes a gimbal assembly for supporting a fluid actuated die set; and, FIGS. 7a, 7b are fragmentary views of the jaw mechanism shown in FIG. 2 with portions removed.
Figure 6B:
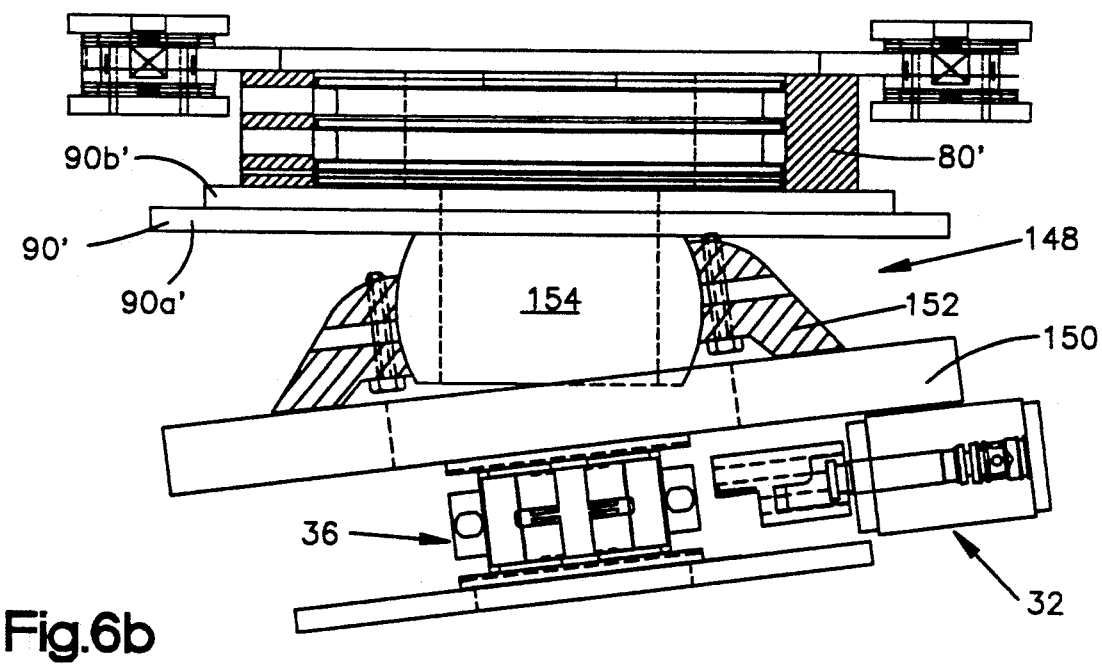

FIGS. 6a and 6b illustrate a mounting arrangement which allows angled movement (vertically, horizontally, etc.) in the die mechanisms. In this embodiment, a gimbal assembly 148 is mounted to the back plate 90'. The actuators, i.e., notching and cut-off actuators are in turn mounted to a gimbal plate 150. As seen in FIG. 5b, the gimbal plate 150 includes a socket member 152 which movably engages a spherical element 154 attached to the backing plate. This ball socket coupling enables the actuators and associated die elements to be positioned at an angle with respect to the center line of the machine. This feature enables angled cuts to be made on the strip stock. For example, should a 45° cut be desired in the strip stock, the gimbal plate 150 is rotated 45° about the ball element 154 as seen in FIG. 5b.

The gimbal assembly 148 is locked into a given position by clamping bolts 160. In the illustrated embodiment, the socket member 152 is split into collar and base components 152a, 152b. The base component 152b is rigidly attached to the die plate 150. The clamp component 152a is adapted to threadedly receive the clamping bolts 160. The ball 154 is released by unthreading the bolts 160 to allow the components 152a, 152b to separate. Once the mounting plate 150 is moved to a selected position, the bolts 160 are re-tightened to draw the components 152a, 152b together. Due to the radii of the various components, the socket member 152 will clamp onto the ball 154 and resist relative movement between the two components.

In this embodiment, the mounting plate 90' would preferably comprise separate mounting plates 90a', 90b'. The plate 90b' is rigidly attached to the coupling member 80'. The mounting plate 90a', however, is slidably moveable with respect to the plate 90b' so that the gimbal assembly 148 can be moved laterally so that the jaw mechanism 30 can be re-aligned with the center line of the overall machine. It should be understood, that angled movement of the mounting plate 150 will cause the dies mounted to the plate 150 to move off-center. Relative movement between the plates 90b', 90a' will allow the mechanism to be re-aligned.

The disclosed invention provides a very flexible machine capable of performing multiple operations on strip stock, including cutting, punching, slotting, shearing, etc. In the past, flying cut-off machines were generally limited to shearing or cutting operations. The present invention provides a machine that enables multiple operations to be performed either concurrently or sequentially upon a strip stock segment on a continuous basis as the strip stock exits the strip forming machine. Because the operations are done on the "fly", the strip stock remains in motion throughout the machine operation resulting in substantially increased throughput as compared to operations that would require the strip stock segments to be collected and transferred to other punching/cutting machines.

Although the invention has been described in connection with cut-off dies, it should be understood that hydraulically operated punches can also be mounted to the heads. Referring again to FIG. 1, the head 12a, as described above, includes a notching and cut-off die set for severing a segment of strip stock from the continuous strip being discharged by the strip forming machine 16. The heads 12b, 12c may include hydraulically operated punches (which are also mounted to rotatable backing plates to adjust their orientation with respect to the strip stock) and are operated to punch holes, slots, bend product, make miter cuts, upset product, etc. in the strip stock prior to or concurrently with operation of the cut-off mechanism forming part of the head 12a (notching).

As a result, a wide variety of strip products can be formed on the disclosed machine. In one application, drawer slides, which are generally formed from U-shaped strip stock, can be entirely formed in the disclosed machine. All punching, slotting, notching, metering, bending, and/or upsetting operations are formed by one or more heads 12a–12c forming part of the flying die apparatus.

Although the invention has been described with a ceratin degree of particularity, it should be understood that those skilled in the art can make various changes to it without departing from the spirit or scope of the invention as hereinafter claimed.

I claim:

1. A flying die apparatus, comprising:
   a) a carriage mounted for reciprocal movement along a predetermined path aligned with a process line along which strip stock in conveyed;
   b) at least one die head mounted to said die carriage including die elements for performing forming operations on strip stock passing along said processing line;
   c) means for accelerating said carriage to synchronize speed with the speed of said strip stock moving along said processing line;
   d) rotatable mounting means forming part of said die head for permitting rotation in a tool mounting pate about an axis defined by said processing line;
   e) means for conveying a source of pressurized fluid to an actuator forming part of said die head and further including means for communicating a fluid pressure return line with said actuator.

2. The apparatus of claim 1, wherein said rotatable mounting means includes a rotatable fluid coupling allowing relative rotation between a base plate and said actuators while providing fluid communication between said base plate and said actuator.

3. The apparatus of claim 2, further including a gimbal assembly for enabling gimbal movement in an actuator mounting plate.

4. The apparatus of claim 3, wherein said gimbal assembly includes a split collar adapted to receive and lock onto a spherical element.

5. The apparatus of claim 2, wherein said rotatable fluid coupling comprises a hub fixed to said base plate, defining at least two annular channels, and further comprises a coupling member, sealingly engaged by said hub while allowing relative rotative movement between said hub and said coupling member.

6. The apparatus of claim 5, wherein said coupling member includes a peripheral, annular recess and said apparatus further comprises at least one clamping member carried by said base plate which includes structure engageable with said annular recess formed on said coupling member whereby clamping forces are applied to said coupling member to inhibit relative rotation between said coupling member and said base plate.

7. The apparatus of claim 6, wherein said structure comprises a tongue integrally formed with said clamping member and sized to fit within said annular recess.

8. The apparatus of claim 5, wherein said fluid coupling further defines a third annular channel communicating with a drain conduit.

9. The apparatus of claim 1, wherein said carriage mounts a plurality of die heads all of which move in unison when said carriage is accelerated.

10. The apparatus of claim 9, further comprising head spacing adjustment means extending between said heads which are operative to produce concurrent movement in said heads during carriage acceleration and further operative to adjust the spacing of said heads under predetermined conditions.

11. The apparatus of claim 10 wherein, said head spacing adjustment means comprises a plurality of ball screws extending between said heads, each of said heads including associated rotatable nut assemblies threadedly engaged by said bal screws.

12. The apparatus of claim 11, further including means for concurrently rotating the nut assemblies of a given head in order to produce movement of said head along said ball screws.

13. The apparatus of claim 12, further comprising means for rotating said ball screws to produce concurrent movement in said die heads to adjust the overall position of said die heads within said carriage.

14. The apparatus of claim 1, wherein said die head mounts a shearing die.

15. The apparatus of claim 1, wherein said die head mounts a notching die.

16. The apparatus of claim 1, wherein said die head includes multiple die elements, one of which is a jaw mechanism.

17. The apparatus of claim 16, wherein said jaw mechanism includes independent mounting means enabling said jaw mechanism to move independently of said other die elements.

18. The apparatus of claim 17, wherein said independent mounting means comprises an arcuate key supported by annular recesses defined in jaw mechanism mounting plates which enable rotative movement between the jaw mechanism and the jaw mounting plates.

19. The apparatus of claim 18, further comprising drive means for moving said jaw mechanism between a plurality of rotative positions.

20. The apparatus of claim 19, wherein said drive mechanism includes an arcuate gear segment operatively engaged by a motor driven gear.

* * * * *